United States Patent [19]

Canovas et al.

[11] Patent Number: 5,365,668
[45] Date of Patent: Nov. 22, 1994

[54] DEVICE FOR MONITORING THE WEAR ON A TIRE AND THE GEOMETRY OF A VEHICLE'S ROAD WHEELS

[75] Inventors: Gines Canovas, Amberieux-d'Azergues; Marc Debilly, Fourcon, F-69620 Saint-Laurent-d'Oingt; Christian Boireau, Saint-Didier-au-Mont-d'Or, all of France

[73] Assignees: Robert Galvin, Villeurbanne; Marc Debilly, Saint Laurent d'Oingt; Gerard Raffault, Lucenay, all of France

[21] Appl. No.: 934,490

[22] PCT Filed: Mar. 19, 1991

[86] PCT No.: PCT/FR91/00221

§ 371 Date: Sep. 15, 1992

§ 102(e) Date: Sep. 15, 1992

[87] PCT Pub. No.: WO91/14919

PCT Pub. Date: Oct. 3, 1991

[30] Foreign Application Priority Data

Mar. 19, 1990 [FR] France .................. 90 03696
Jun. 25, 1990 [FR] France .................. 90 08198

[51] Int. Cl.⁵ ............................................ G01B 7/26
[52] U.S. Cl. .................................. 33/203.11; 33/836; 33/504; 33/558
[58] Field of Search ............... 33/203, 203.11, 203.18, 33/561.1, 556, 832, 833, 504, 505, 558

[56] References Cited

U.S. PATENT DOCUMENTS

| | | | |
|---|---|---|---|
| 2,662,295 | 12/1953 | Heal | 33/836 |
| 3,170,243 | 2/1965 | Williams . | |
| 3,740,710 | 6/1973 | Weintraub et al. | 33/203.11 X |
| 4,195,413 | 4/1980 | Haraguchi et al. . | |
| 4,227,308 | 10/1980 | Talansky et al. . | |
| 4,574,490 | 3/1986 | Curchod | 33/203.18 |
| 4,631,831 | 12/1986 | Bacher et al. . | |

FOREIGN PATENT DOCUMENTS

| | | | |
|---|---|---|---|
| 2900040 | 7/1979 | Germany . | |
| 55-101803 | 10/1980 | Japan . | |
| 0190208 | 11/1982 | Japan | 33/556 |
| 58-106405 | 6/1983 | Japan . | |
| 1211575 | 11/1970 | United Kingdom | 33/203.11 |
| 2219401 | 12/1989 | United Kingdom . | |
| 2220491 | 1/1990 | United Kingdom . | |

*Primary Examiner*—William A. Cuchlinski, Jr.
*Assistant Examiner*—Alvin Wirthlin
*Attorney, Agent, or Firm*—Oliff & Berridge

[57] ABSTRACT

A portable device for monitoring the wear of a tire and the geometry of a wheel set of a vehicle has a probe for measuring a depth of each tread groove of a tire, a display, a symbolic representation of a set of wheels, and indicators. The device includes a control system for processing and calculating measurements, reference values and compared values relating to rate of wear and the condition of the geometric state of the tire. Resulting calculations and comparisons are displayed on the display and indicators are activated based on the calculations and comparisons made.

9 Claims, 3 Drawing Sheets

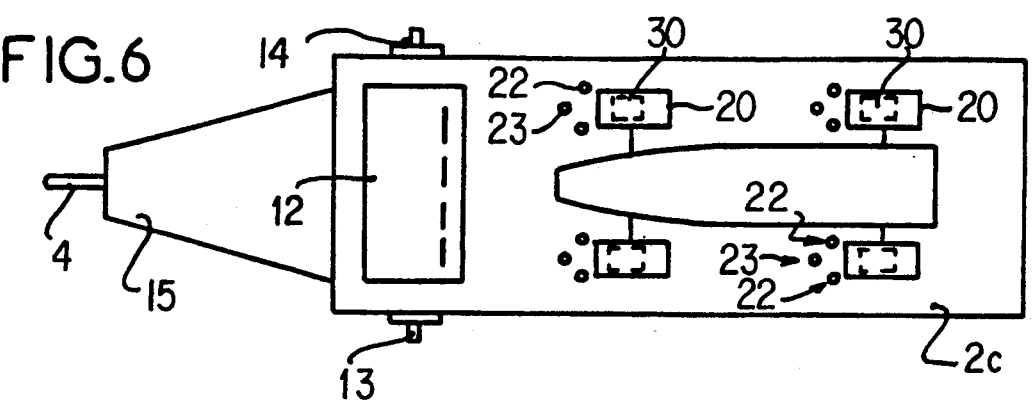
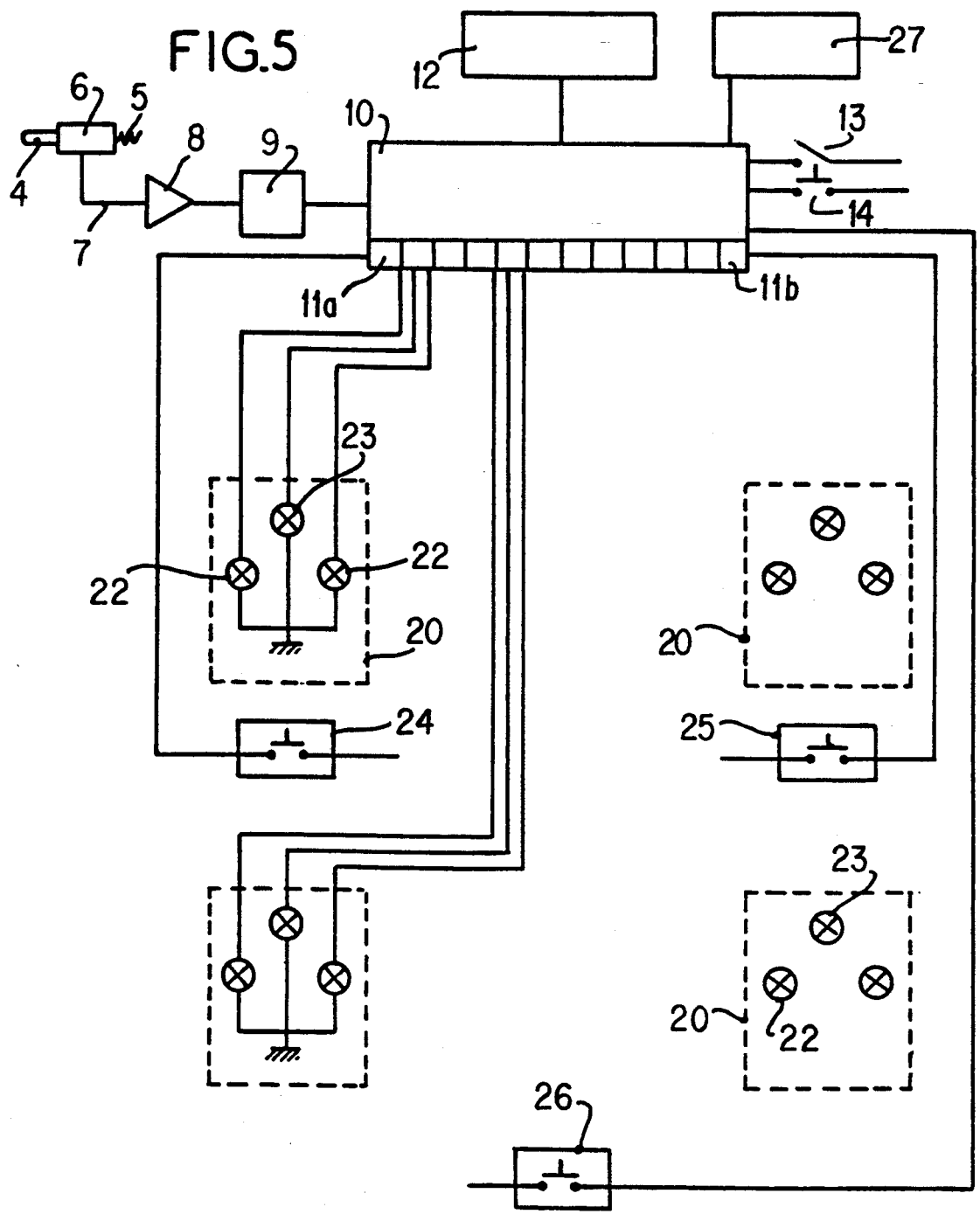

DEVICE FOR MONITORING THE WEAR ON A TIRE AND THE GEOMETRY OF A VEHICLE'S ROAD WHEELS

BACKGROUND OF THE INVENTION

In order to monitor the wear of a tire, it is known to use depth gauges comprising a probe able to engage into each groove of a tire, a bearing face able to come into contact with the peaks of the ribs and a means of reading giving the depth of engagement of the probe in the groove.

Such gauges are either mechanical, in which case the reading is effected on a graduated scale, or electronic, in which case they comprise means converting the position of the probe into an analog or digital electrical signal, means of processing and of calculation and means of display of the result of the measurement.

The device described in the U.S. Pat. No. 4,631,831 also comprises means memorizing the values of each measurement, calculating the mean value of these measurements and transmitting this result to the means of display.

Such an apparatus thus provides the mean value, expressed in millimeters, of the depth of the ribs and, consequently, merely indicates a value relating to the wear of the tire permitting management of a fleet of vehicles.

SUMMARY OF THE INVENTION

The aim of the present invention is to provide means, of the type quoted above, which permit, in addition to and on the basis of a measurement of the wear of a tire, detection of faults in geometry of the wheel set carrying this tire, namely, camber, parallelism, caster, and to do so without the operator needing to carry out any calculations.

These means are of the type comprising a portable box, a probe which is movable with respect to a bearing face and able to measure the depth of each groove of the tread of the tire, means converting the position of the probe into a signal, means memorizing this signal, means of processing and of calculation processing each signal and sending a data item to a means of visual display.

According to the invention, they also comprise means converting each of the depth measurements, effected at at least two opposed lateral points on the tread, into the form of a rate of wear, determined by reference to a groove depth corresponding to nil wear and memorized in the means of processing and of calculation, means bringing about the display and the memorizing of each measurement result, and at least one means of control able to trigger the means of processing and of calculation to compare the memorized measurement results and to send to the means of display a data item indicating the state of the geometry of the tire.

Thus, after having taken account of the rate of wear of the tire on each measurement region, the operator can, by simple action on a manual control, and by virtue of the means of processing and of calculation previously used for converting the depth into a percentage, bring about the display of a data item on the state of the geometry of the wheel set.

According to the embodiments, this data item is constituted by the most significant rate of wear or by the rate corresponding to the deviation between the measured wears. Needless to say, if the deviation between the displayed wears is nil, the means of display indicate a nil value, that is to say zero, which indicates that the wear of the tread is uniform and that the geometry of the wheel set does not have to be examined, which is not the case for any other value of deviation.

In one embodiment of the invention, the means of monitoring comprise, on the face of the box incorporating the means of display and in proximity to a symbolic representation of at least one wheel of the vehicle, on the one hand, as many means of light signalling as the number of measurements having to be effected on each tire, these means being arranged with respect to the representation of the wheel in the same way as the measurement regions on the tread, on the other hand, a means of control triggering, after carrying out the measurements on each wheel, the means of processing and of calculation to compare the memorized values of the depth measurements effected, to display on the screen the maximum value indicated in the form of a rate with respect to nil wear and to control the supply, nil or permanent, of the light means in relation to the rate of wear peculiar to the position of each means, and moreover, another means of control triggering, at the end of the measurement cycle for a wheel, the means of processing and of calculation to compare the memorized values of the depth measurements and to display the deviation between these values on the screen.

With this apparatus, at the end of measurement of a wheel and by actuating the means of control, the operator can be informed of the value of the maximum rate of wear, by reading the display means, and the location of this rate, by examining the means of light signalling. By examining the means of display he is also informed of the rate corresponding to the deviation between the measurements of wear, and thus of the state of the geometry of the wheel set carrying the wheel.

In one embodiment of the invention, these means comprise, on the face of the box incorporating the means of display and in proximity to a symbolic representation of at least one wheel of the vehicle, on the one hand, at least as many means of light signalling as the number of measurements having to be effected on each tire, these means being arranged with respect to the representation of the wheel in the same way as the measurement regions on the tread, on the other hand, on a circuit of the means of processing and of calculation dedicated to the means of light signalling, a trigger contact for a measurement cycle comprising the following sequences:

supply of the means of light signalling allocated to the first measurement of the cycle, after validation of the first measurement, processing of the signal S1 of the validated measurement, display of a rate of wear corresponding to this signal, memorization of this signal, comparison of this signal S1 with a value VR corresponding to nil wear and memorization of the residual value V1, and so on for each of the measurements on a wheel, at the end of measurement of a wheel, comparison of the extreme measurements, display of the result R1 of this comparison giving the rate of the deviation in wear of the tread, comparison of the result R1 with a value K, corresponding to the maximum tolerated deviation and obtainment of a memorized value R2, summation of the memorized results V1 . . . Vn, R2, analysis of the sum obtained and transmission to the light means of a supply command, which is nil, permanent or intermittent in relation to the state of the tire and the position on the latter of maximum wear.

With this monitoring apparatus, after selection on the box of the wheel which has to be measured, the operator is guided in its measurement by the light means of the box, is automatically informed, by a display in the course of measurement, of the rate of wear resulting from the current measurement and, at the end of a cycle of measurement and by display, of the rate corresponding to the deviation between the various measurements. At the end of measurement, he is also informed of the state of wear of the tire and of the geometry of the wheel set carrying the wheel by synoptic means constituted by the light means arranged at the side of a representation of the wheel.

Other characteristics and advantages will emerge from the description which follows with reference to the attached diagrammatic drawing, representing, by way of non-limiting examples, several embodiments of the means according to the invention.

BRIEF DESCRIPTION OF THE DRAWING

FIG. 5 is a diagrammatic view of the components of the apparatus of FIG. 4, FIG. 6 is a plan view from above representing another embodiment of the apparatus.

DETAILED DESCRIPTION OF PREFERRED EMBODIMENTS

Figure 1:
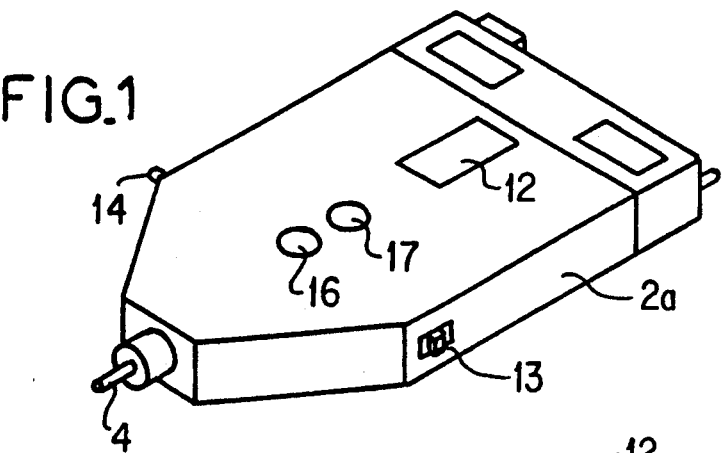
FIG. 1 is a view in perspective showing a first embodiment of the monitoring apparatus.
Figure 2:
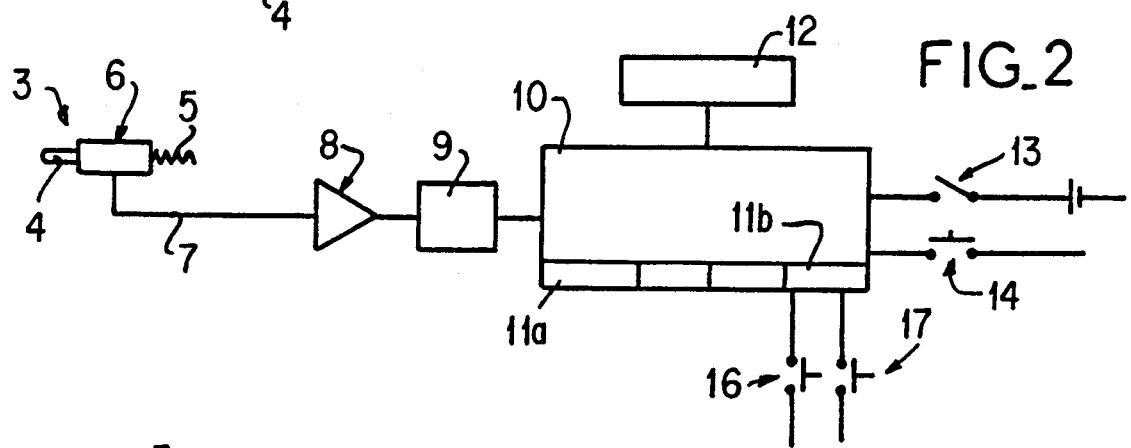
FIG. 2 is a diagrammatic view representing its essential components.

All the apparatuses represented in the drawing comprise a portable box respectively 2a-2b and 2c, a depth gauge designated by 3 overall and whose probe 4, loaded by a spring 5, is associated with a sensor 6 converting the displacements of the probe into proportional or digital electrical signals. As FIG. 2 shows, the sensor is linked by a circuit 7 to an amplifier 8 followed, if the signals transmitted by the sensor 6 are analog, by an analog-digital convertor 9. The circuit 7 terminates in an assembly for processing and calculation 10, constituted in general by a microprocessor, controlling the operation of the means of display 12, for example a liquid crystal display. Each apparatus also comprises a start-stop button 13 and means 14 of validation of the measurement effected, means which, in the embodiment of FIGS. 1 and 6, are constituted by a push button, while, in the embodiment represented in FIG. 4, they are constituted by a contact arranged in the nose 15 of the apparatus. The means of processing 10 are associated with erasable memories 11a, and with non-erasable memories 11b, and with means of zero resetting of the memories 11a.

Figure 3:
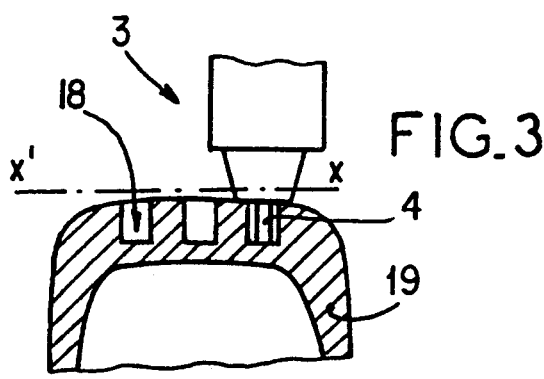
FIG. 3 is a partial sectional view showing the conditions of use of the apparatus, when its probe is introduced into one of the grooves of the tread of a tire.

In the embodiment represented in FIGS. 1 to 3, the monitoring apparatus comprises two means of control 16–17 constituted by push buttons accessible from the upper face of the box and able to trigger the operation of the means of processing and of calculation 10.

More precisely, after the apparatus has been put into operation by actuating the start-stop button 13, the operator engages the probe 4 of the latter into one of the lateral grooves 18 of the tread of a tire 19, taking care to give this probe a radial direction with respect to the axis of rotation of the wheel. When the probe is in contact with the bottom of the groove, the operator continues to bring the apparatus close until its nose 15 comes to abut on the face of the ribs bordering the groove. Under these conditions, the means 6 convert the position of the probe 4 into analog signals. These signals are converted by the means 9 into digital signals. The means of processing and of calculation memorize this data item and, possibly, compare it with a memorized value corresponding to a groove depth having a nil rate of wear, and send a data item on the rate of wear to the display 12. Next in the process is at least one second measurement in the groove of the tread opposite to that where the first measurement was effected. The signals corresponding to the depth measured are also memorized and possibly compared to the reference value in order to send another data item on the rate of wear to the display 12.

When these measurements have been effected, the operator actuates the button 16, which has the effect of bringing the means of processing and of calculation 10, to compare the memorized values of the first two measurements, of selecting the value corresponding to the greatest wear of the tread, of transforming this value into a percentage and of bringing about the display of this percentage on the display 12. When the operator presses on the contact 17, the means of processing and of calculation again compare the two memorized values and, if there is a deviation between them, convert this deviation into a difference in wear which is displayed on the display 12.

It emerges from the foregoing that after monitoring of the rate of wear of the tread of the tire, the operator can, by simple reading of the display 12, know the difference in wear and deduce, from the state of the treads, the state of the geometry of the means linking the wheel to the chassis of the vehicle. More precisely, if the deviation between the two values measured is nil, the wear of the tire is uniform, but if this deviation has a value lying between 0 and 99%, this indicates that the tread is inclined with respect to the x'—x position that its peripheral face should have, and that manifestly there exists a misalignment of the geometry of the means of linking of the wheel with respect to the chassis, or deterioration of the chassis.

Figure 4:
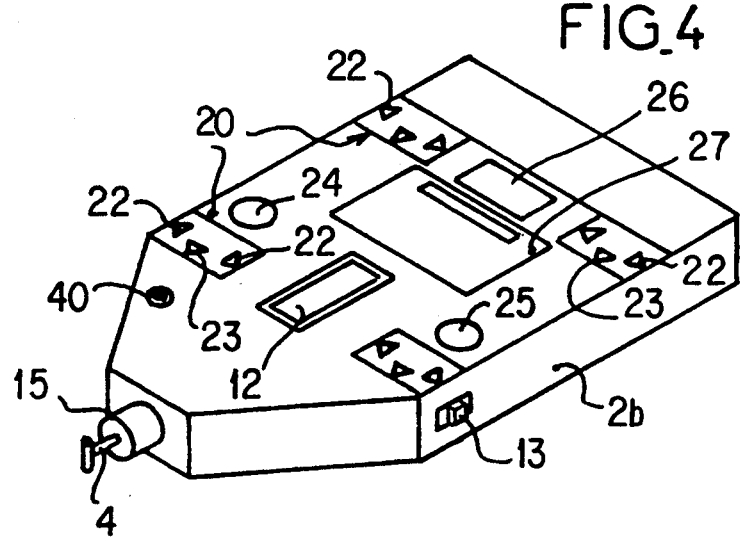
FIG. 4 is a view in perspective showing another embodiment of the apparatus.

In the embodiment represented in FIGS. 4 to 5, the monitoring apparatus comprises on one of the faces of its box 2, four graphical representations 20 of the four wheels of a vehicle, and distributed like them on the face of the box. Each graphical representation is associated with means of light signalling 22 constituted, for example, by electroluminescent diodes. The number of these means 22 is equal to the number of measurements which it is advisable to effect on the tread of each wheel, and, for example, are two in number in this embodiment. FIG. 4 shows that the diodes 22 are arranged with respect to the graphical representation 20 of the wheel in the same way that the measurements on the tread of this wheel have to be effected. In this embodiment, they are associated with another diode 23 arranged differently with respect to them and, for example, in front. In practice, the diode 23 is green in color and those 22 are red in color.

As FIG. 5 shows, the control circuit for the means of processing 10 comprises two buttons 24 and 25, acting on the supply to the diodes 22 and 23, and a button 26 triggering the operation of a printer 27 under the control of the means of processing and of calculation 10. These buttons 24 to 26 are accessible from the face of the box 2b incorporating the graphical representations 20 of the wheels.

In the measurement phase, the operation of this monitoring apparatus is the same as that previously described, namely that, for each wheel, the operator effects a probing at two opposed points on the tread and that the value of the groove depths, converted into digital signals, is memorized in the means of processing and of calculation 10 until the operator actuates the button 24. Under these conditions and as before, the means of processing and of calculation 10 compare the measured values, select the greatest value and send, to the display 12, a value indicating the rate of wear corresponding to this value. Simultaneously, the means of processing and of calculation 10 command the supply to the diodes 22 and 23 as a function of the measurement, namely supply to the diode 23, green in color, if the tread exhibits normal wear, within the allowable limits, or supply to one of the diodes 22 if the wear observed is beyond the normal value. Under these conditions, diode 22 which is supplied, is that which is situated inside the box, if the tread is more worn towards the inside, and that outside the box, if this tread is more worn over its outer part.

Faced with these visual and light data, the operator deduces whether he is in the presence of a misalignment of the geometry of the wheel set, a misalignment whose value he obtains by actuating button 25. In fact, under these conditions and as for button 17 of the preceding embodiment, the means of processing and of calculation 10 compare the two values of the measurements and convert the deviation in them into a percentage which is displayed on the display 12. This deviation can also be supplied on a medium, by actuating button 26 controlling the starting of the printer 27.

In one embodiment variant, the means of light signalling 23 are constituted by a two-color diode, red and green. In this configuration, at the end of comparison of the measured values, the state of wear of the tire is signalled either by the color green, if the wear is normal, or by the color red if the wear is considered abnormal, and this occurs independently of the light means constituted by the diodes 22 which indicate the side of the misalignment.

Figure 7:
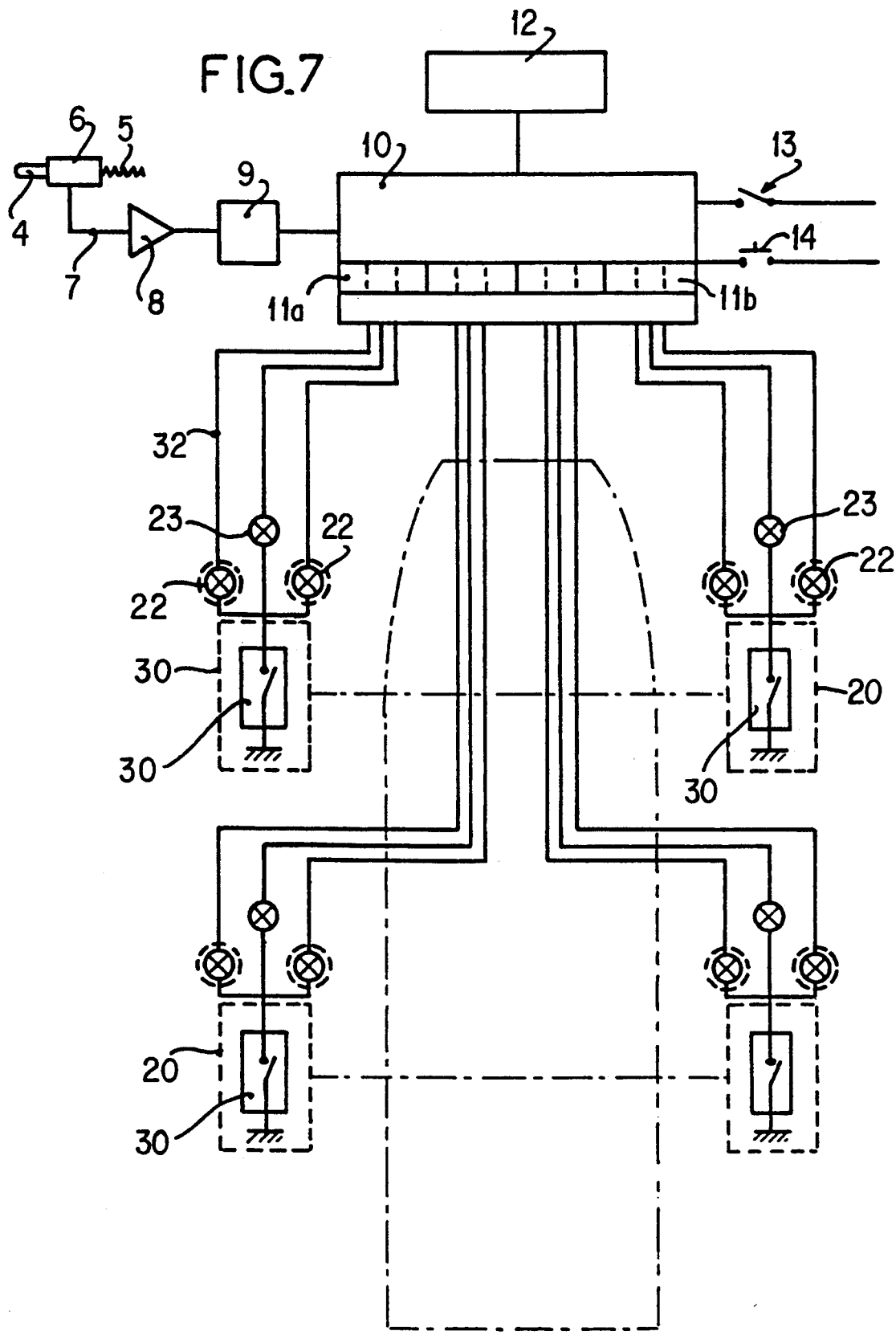
FIG. 7 is a diagrammatic view of the components of the apparatus of FIG. 6.

Although, in the two preceding embodiments, the monitoring apparatus according to the invention permits indication of the state of misalignment of the geometry of a wheel on its wheel set, and does so without the operator having to carry out any calculation, it is still possible, through errors in manipulation or in positioning of the box with respect to the wheels in the measurement phase, to arrive at errors of interpretation of the indications supplied by the display by the diodes. In order to remedy this, the apparatus represented in FIGS. 6 to 7 incorporates, for each group of light means 22–23, and under the graphical representations 20 of each wheel of the vehicle, a button 30 which acts on the means of processing and of calculation 10 in order to, on the one hand, organize and manage the measurements, and on the other hand, launch a measurement cycle for each wheel.

With this apparatus, after actuating the stop-start button 13 controlling its supply, the operator must first of all proceed to the selection on the apparatus of the graphical representation 20 of the wheel which he envisages measuring. This selection is effected by pushing on the button 30 arranged under the chosen graphical representation. This contact, arranged on a circuit 32 of the means of processing and of calculation 10, which is dedicated to the light means 22 and 23 which are juxtaposed with the representation 20 chosen, triggers the measurement cycle peculiar to the wheel, a cycle whose first sequence consists in bringing about the supply to the diode 23 and to one of the diodes 22, namely, for example, that arranged at the outside on the representation. By illumination of these diodes, the operator is informed that the group is selected, that the measurement cycle will commence and that he must engage the probe 4 of the box in the outermost groove of the tread of the chosen wheel.

As in the preceding embodiments, the operator engages the probe 4 in the chosen groove 18 until contact with its bottom and continues to advance the apparatus until the bearing face of the nose comes into contact with the tread.

During this operation, the unit for processing and for calculation 10 sends to the display 12 data which permit it to display a rate of wear which goes on increasing until contact of the nose 15 on the tread.

When the operator presses on the validation button 14, the value S1 corresponding to the rate displayed is memorized and compared with a value VR corresponding to nil wear. The residual value V1, resulting from this comparison, is memorized in its turn.

At the end of this first measurement operation, the unit for processing 10 interrupts the supply to the diode 22 arranged at the outside of the same graphical representation 20 and commands the supply to the diode 22 arranged inside the same representation in order to signal to the operator that he can effect the second measurement on the inner side of the tread. The measurement procedure is the same and leads to the memorizing of a signal S2 and of a residual value V2.

At the end of measurement of a wheel, the unit for processing and for calculation 10 compares the values of the extreme measurements S1–S2, and sends to the display 12 a data item R1 corresponding to the difference between these values, expressed as a rate of wear of the result R1 obtained. The result of this is that the operator instantly has knowledge of the deviation of the rate of wear on the tread, and, consequently, of the state of misalignment of the geometry of the wheel on its wheel set.

Simultaneously, the unit for processing and for calculation compares the value of R1 with a value K corresponding to the maximum tolerated deviation and memorizes the value of the result R2 obtained. This value K is either memorized, or calculated.

The means of processing then carry out the summing of the digital values of the memorized results V1—V2—R2, analyze the final result and transmit to the light means 22 and 23 a command for nil, permanent or intermittent supply, in relation to the state of the tire and the position on the latter of the fault in geometry.

More precisely, when the result of the summation indicates that the tire is in a good state of wear, and is without geometric fault, the means of processing 10 command the supply to the diode 23 of green color. If the summation makes it apparent that the maximum wear is exceeded on one side of the tread, the means of processing 10 bring about the supply to the corresponding red diode 22, a diode which also indicates faults in geometry. In the presence of an exceeded maximum wear over the whole width of the tread, the two red diodes 22 are supplied. Finally, in the presence of an excessive asymmetry of wear on one side, the corresponding red diode is supplied intermittently, in order better to draw attention.

It emerges that at the end of a measurement cycle for one wheel, and complementing the data given by the display 12, the operator has available a synoptic light data item pointing him towards his final decision to replace the tire or to proceed to the checking of the geometry of the wheel on its wheel set.

Needless to say, the operator proceeds in the same way for each of the wheels of the vehicle and by virtue of the maintenance of the electrical supply to the light means of the various groups corresponding to the wheels of the vehicle, the operator has available, at the end of the monitoring operation of the wheels of a vehicle, a synoptic table retracing all the faults picked up and permitting him all the better to appreciate the faults in geometry in the wheel sets, if any exist.

In one embodiment variant, the measurement cycle triggered by one of the two control buttons 30 associated with any one of the wheels of a wheel set, comprises, after the measurement of the wheels of the wheel set, the comparison between the memorized values S1–S2 of one wheel and the memorized values S1'–S2' of the other wheel of the same set, the selection of the value corresponding to the greatest wear, the comparison of this residual value with a memorized reference value H, corresponding to the maximum tolerated deviation between the wears of the two wheels of the same set. On the basis of a threshold of the value obtained by this comparison, the means of processing and of calculation 10 command the supply to the means of signalling 22 arranged, on the synoptic representation of the wheel set, at the same place where the greatest wear on the wheels monitored is situated.

This additional cycle makes it possible to check the geometry of the wheel set, especially, when the rates of wear of each of the wheels have insufficient deviations to be considered as a fault in geometry of the wheel set.

It is obvious that the device, which has been described above in the context of its application to the monitoring of the wear of tires and to the monitoring of the geometry of the wheel sets of a motor vehicle with four wheels, can be configured, without departing from the scope of the invention, to permit the monitoring of a vehicle comprising more than four wheels, such as a lorry. In the same way, it would not depart from the scope of the invention to associate with each wheel, not only two means of light signalling 22, but three or four, for example to effect three or four measurements on wide tires.

Finally, the microprocessor 10, which is arranged in the box, can, in a known way, be connected, for example by a socket 40 visible in FIG. 4, to any other means of processing of the digital data or to means making it possible to formalize, on paper or on magnetic medium, the data contained in its temporary memories 11a.

What is claimed is:

1. A device for monitoring the wear of a tire and the geometry of a wheel set of a vehicle, the wheel set comprising a plurality of tires, the device comprising:
   a portable housing having a display;
   a depth gauge provided in said portable housing and comprising a probe, said probe measuring groove depth in the tread, a first groove being located on one side of the tread and a second groove being on a laterally opposite side of the tread; and
   a control system comprising:
      first converter means for converting probe depth measurements into groove depth signals;
      memory means for storing the groove depth signals;
      activator means for displaying a modified form of at least one groove depth signal on said display;
      a first reference value stored in the memory and representing a measurement of the groove depth of a groove having zero wear;
      second converter means for converting the groove depth signals into wear rate signals by comparing the groove depth signals with the first reference value, at least one wear rate signal being displayed on the display and stored in the memory;
      first comparator means for comparing at least a first groove depth signal representative of a depth of the first groove with a second groove depth signal representative of a depth of the second groove to determine a wear differential across the tire, the wear differential being displayed on the display and stored in the memory;
      wear differential comparator means for comparing the wear differential with a maximum permissible differential value stored in the memory means;
      means for storing a result of the differential comparison in the memory means;
      means for determining a geometrical state of the tire from the stored result; and
      means for sending a signal representative of the geometrical state of the tire to the display.

2. The device according to claim 1, wherein the control system further comprises:
   second comparator means for comparing the first groove depth signal with the second groove depth signal to determine which groove has a greater rate of wear, the greater rate of wear being displayed on the display and stored in the memory means.

3. The device according to claim 2, further comprising:
   a symbolic representation of at least one wheel in the set of wheels of the vehicle, the symbolic representation located on a face of the portable housing;
   a plurality of indicators equal to a quantity of measured regions of the plurality of tires, each indicator corresponding to one of the at least one wheel in the symbolic representation; and
   wherein the control system further comprises:
      first controller means for activating the second comparator and for controlling activation of the indicator corresponding to the greater rate of wear, and
      second controller means for operating the first comparator means.

4. The device according to claim 3, wherein the plurality of indicators comprise at least four groups of indicators and the symbolic representation comprises four wheels, each group of indicators being positioned adjacent one wheel of the symbolic representation.

5. The device according to claim 4, further comprising:

third controller means, associated with each of the at least four groups of indicators, for selecting one of the four wheels and for activating the control system.

6. The device according to claim 2, further comprising:
a symbolic representation of at least one wheel of a set of wheels for a vehicle, the symbolic representation located on a face of the portable housing;
a plurality of indicators equal to a quantity of measured regions on at least one tire, each indicator being positioned with respect to the symbolic representation of one wheel; and
wherein the control system further comprises:
third comparator means for comparing a wear rate signal, corresponding to the first groove, the wear differential and the greater rate of wear; and
controller means for activating the indicators in response to an output of the third comparator.

7. The device according to claim 6, further comprising:
a second reference value stored in the memory means representing a maximum tolerated deviation between wear rates of any two wheels in the wheel set;
fourth comparator means for comparing wear rates of any two wheels in the wheel set to determine a greatest wear rate of the wheels in the wheel set;
greatest wear differential comparator means for comparing the greatest wear rate of the wheels with the second reference value to obtain a value; and
means for activating an indicator based on the obtained value.

8. The device according to claim 6, wherein said plurality of indicators further comprise:
a confirmation indicator for confirming a selection of a wheel to be measured; and
an overall indicator for indicating a good state of wear based on results from the control system.

9. The device according to claim 2, wherein the depth gauge further comprises a bearing face and the probe is movable relative to the bearing face for measuring the groove depth in the tread.

* * * * *